United States Patent
Morris et al.

(10) Patent No.: US 10,708,203 B2
(45) Date of Patent: Jul. 7, 2020

(54) SYSTEMS AND METHODS FOR INDICATING EMOTIONS THROUGH ELECTRONIC SELF-PORTRAITS

(71) Applicant: CONVERGENCE ACCELERATION SOLUTIONS, LLC, Atlanta, GA (US)

(72) Inventors: Drewry Hampton Morris, Atlanta, GA (US); Jared Trotter, Atlanta, GA (US)

(73) Assignee: Convergence Acceleration Solutions, LLC, Atlanta, GA (US)

(*) Notice: Subject to any disclaimer, the term of this patent is extended or adjusted under 35 U.S.C. 154(b) by 258 days.

(21) Appl. No.: 14/750,348

(22) Filed: Jun. 25, 2015

(65) Prior Publication Data

US 2015/0381534 A1   Dec. 31, 2015

Related U.S. Application Data

(60) Provisional application No. 62/017,198, filed on Jun. 25, 2014.

(51) Int. Cl.

| | | |
|---|---|---|
| *G06F 3/0482* | (2013.01) | |
| *H04L 12/58* | (2006.01) | |
| *G06F 3/0481* | (2013.01) | |
| *G06Q 50/00* | (2012.01) | |
| *G06F 3/02* | (2006.01) | |

(52) U.S. Cl.
CPC ......... *H04L 51/046* (2013.01); *G06F 3/0482* (2013.01); *G06F 3/04817* (2013.01); *G06Q 50/01* (2013.01); *H04L 51/10* (2013.01); *H04L 51/32* (2013.01); *G06F 3/0219* (2013.01); *H04L 51/04* (2013.01); *H04L 51/08* (2013.01); *H04L 51/16* (2013.01)

(58) Field of Classification Search
CPC ......... G06Q 50/01; H04L 51/04; H04L 51/10; H04L 51/32; H04L 51/08; H04L 51/16; H04L 51/046; G06F 3/0482; G06F 3/04817; G06F 17/2785; G06F 3/0219
See application file for complete search history.

(56) References Cited

U.S. PATENT DOCUMENTS

| | | | | |
|---|---|---|---|---|
| 9,043,196 | B1* | 5/2015 | Leydon | G06F 3/04842 704/4 |
| 2005/0004993 | A1* | 1/2005 | Miller | H04L 51/04 709/207 |
| 2005/0156873 | A1* | 7/2005 | Walter | H04L 51/04 345/156 |

(Continued)

OTHER PUBLICATIONS

Perez, Sarah (Imoji for iPhone Lets You Turn Any Image Into a Custom Emoji, blog entry posted at TechCrunch.com on Jul. 24, 2014. Retrieved from [https://techcrunch.com/2014/07/24/1034341/] on [Jul. 4, 2017]. 7 pages).*

(Continued)

*Primary Examiner* — Tuyetlien T Tran
(74) *Attorney, Agent, or Firm* — Troutman Sanders LLP; Christopher C. Close, Jr.; Korbin Blunck

(57) ABSTRACT

Aspects of the present disclosure generally relate to systems and methods that allow a user of an electronic device, who is engaged in communicating with one or more other users, to convey an emotional context with that communication using an image created by the user.

10 Claims, 7 Drawing Sheets

(56) References Cited

U.S. PATENT DOCUMENTS

| | | | | |
|---|---|---|---|---|
| 2006/0015812 | A1* | 1/2006 | Cunningham | G06F 3/0219 715/263 |
| 2006/0282503 | A1* | 12/2006 | Gwozdz | G06Q 10/107 709/206 |
| 2007/0136419 | A1* | 6/2007 | Taylor | G06F 17/3089 709/203 |
| 2010/0123724 | A1* | 5/2010 | Moore | G06F 3/04817 345/473 |
| 2011/0009109 | A1* | 1/2011 | Hyon | H04M 1/72544 455/418 |
| 2011/0047508 | A1* | 2/2011 | Metzler | G06F 19/322 715/810 |
| 2011/0289428 | A1* | 11/2011 | Yuen | H04L 51/04 715/752 |
| 2011/0296324 | A1* | 12/2011 | Goossens | G06Q 10/10 715/763 |
| 2012/0059787 | A1* | 3/2012 | Brown | G06F 17/241 706/52 |
| 2013/0159919 | A1* | 6/2013 | Leydon | G06F 3/0236 715/780 |
| 2013/0339983 | A1* | 12/2013 | Dai | G06F 9/4443 719/318 |
| 2014/0156762 | A1* | 6/2014 | Yuen | H04L 51/32 709/206 |
| 2015/0172246 | A1* | 6/2015 | Velummylum | H04L 51/18 709/206 |
| 2015/0286371 | A1* | 10/2015 | Degani | G06F 17/274 705/14.64 |
| 2015/0332088 | A1* | 11/2015 | Chembula | G06K 9/00 382/203 |
| 2015/0334067 | A1* | 11/2015 | Zonka | H04L 67/36 715/752 |
| 2016/0050169 | A1* | 2/2016 | Ben Atar | H04M 1/72544 709/206 |
| 2016/0291822 | A1* | 10/2016 | Ahuja | G06F 3/0484 |
| 2016/0292903 | A1* | 10/2016 | Li | G06T 13/80 |
| 2017/0052946 | A1* | 2/2017 | Gu | G06F 17/279 |

OTHER PUBLICATIONS

Livejournal Moods. Web page [http://www.livejournal.com:80/moodlist.bml] published Feb. 8, 2007. retrieved via Internet Archive on [Sep. 16, 2018]. 2 pages. (Year: 2007).*

Brinkman, Martin. 7Conifier, Change Default Icon Set in Windows 7. Blog post at gHacks Tech News dated Sep. 7, 2010 ( updated Jun. 11, 2014). Retrieved from [https://www.ghacks.net/2010/09/07/7conifier-change-default-icon-set-in-windows-7/] on [Sep. 16, 2018]. 5 pages. (Year: 2014).*

* cited by examiner

SYSTEMS AND METHODS FOR INDICATING EMOTIONS THROUGH ELECTRONIC SELF-PORTRAITS

CROSS-REFERENCE TO RELATED APPLICATION

This application claims benefit under 35 U.S.C. § 119(e) of U.S. Provisional Patent Application No. 62/017,198, filed Jun. 25, 2014, entitled "Method of Indicating Through Electronic Self Portraits," which is incorporated herein by reference as if set forth herein in its entirety.

TECHNICAL FIELD

The present disclosure is in the technical field of electronic communication. More particularly, the present disclosure relates to the field of socially oriented electronic communication and conveying non-textual emotional context of an electronic communication.

BACKGROUND

Certain technologies allow a user to capture images camera, including a camera incorporated into a mobile device. Various chat and messaging applications allow users to share such images with others. Such applications do not, however, provide any mechanism for including such images in the messages themselves or for replacing text-based representations of emotions (e.g., text-based emoticons) with the images captured by the camera.

Various other technologies allow users to create an image that indicates or represents an emotion, but the creation and management of such images occurs offline and generally is not integrated into the communication process. Still other technologies allow a user to include custom sets of icons or single images in a message. These applications are deficient, however, as they only allow use of images from a user's profile. Further, even when these technologies allow sets of icons, they do not integrate the ability to add custom images captured with a mobile device's camera. Additionally, while certain social networking applications make use of the embedded image associated with the "username," such applications do not allow sets of images or ad hoc creation of new images.

Aspects of the present disclosure will address these and other limitations.

BRIEF SUMMARY OF THE DISCLOSURE

Briefly described, and according to some embodiments, aspects of the present disclosure generally relate to systems and methods that allow a user of an electronic device to convey an emotional context with via an electronic message or communication using an image created by the user when communicating with one or more other users. Because of limitations associated with SMS texting or chat applications on certain mobile devices, mobile device users wishing to convey a particular emotion in a text or chat have traditionally resorted to using combinations of simple text symbols. Typically referred to as "emoticons," examples include a semicolon followed by a dash and a right parenthesis, which results in a sideways face that is smiling and winking: (i.e., ;-)), or a colon plus a dash and a left parenthesis (i.e., :-( ) to indicate sadness or displeasure. In recent years, as device capabilities have improved, these text-based emoticons have evolved into more complex graphical icons. Further, as emoticons have evolved, mobile devices have increasingly included both forward- and backward-facing cameras. As such, users often use these cameras to take pictures of themselves. These self-portraits, which are often called "selfies," are widely posted to photo sharing and social networking sites (e.g., Instagram®, Facebook®, etc.).

In some embodiments, aspects of the present disclosure combine the use of emoticons and selfies by using a device's camera to allow a user to create a set of self portraits that can be used to convey emotions in electronic messages. Throughout this disclosure, self-portraits that can be used to convey emotions in electronic messages may be referred to as "selfiecons." Additionally, in some embodiments, users can purchase sets of self-portraits of others, which can in turn be used as part of the user's selfiecon set. For example, a user could use selfies of a well-known movie star or comedian as one or more of the user's selfiecons. Further, aspects of the present disclosure relate to systems and methods by which a user can create, update, or delete sets of related selfiecons.

These and other aspects, features, and benefits will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
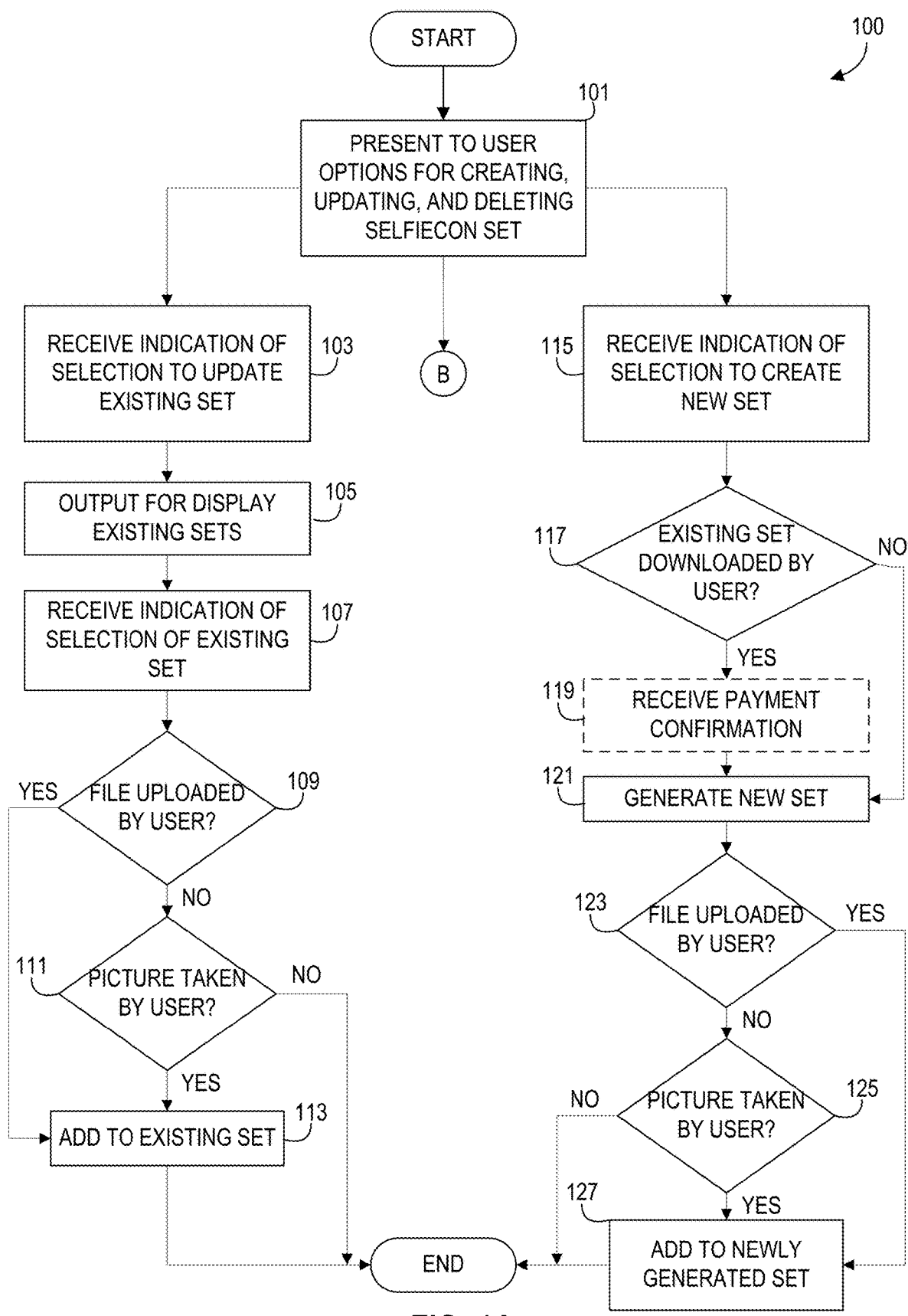
FIGS. 1A and 1B are flow diagrams illustrating an exemplary method for allowing a user to create, modify, and use electronic self-portraits as an indicator of emotion in an electronic communication, according to some embodiments.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates. All limitations of scope should be determined in accordance with and as expressed in the claims.

Figure 1B:
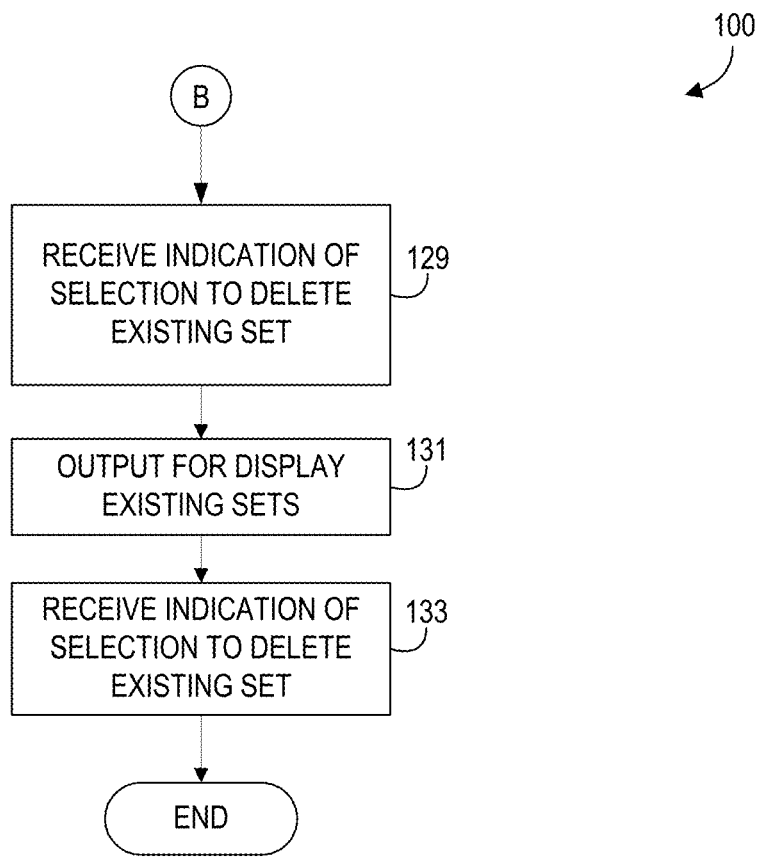

Turning now to the drawings, in which like reference characters indicate corresponding elements, attention is directed to FIG. 1A and FIG. 1B in which a flow chart illustrates a method 100 comprising various steps by which a user can create, modify, and select selfies and sets of selfies, according to some embodiments. As shown in FIG. 1A, at 101, a computing device may present various options for managing a set of self-portraits that can be used to indicate emotions in electronic communications (i.e., "selfiecons"). In some embodiments, the various options can include the option of creating a new set of selfiecons, updating an existing set of selfiecons, or deleting an existing set of selfiecons. In some embodiments, a computing device may present the various options together, or the device may present them separately.

In some embodiments, as shown in FIG. 1A, at 103 a computing device may receive an indication that the user wishes to update an existing emoticon set. Upon receipt of such indication, at 105, the computing device can output for display to the user a list of existing, configured emoticon sets, and at 107, the computing device may receive an indication of which set the user wishes to update, according to some embodiments. After selecting a set to modify, the user may choose to upload a file (e.g., an image stored on the user's device, an image stored on a cloud server, an image stored on an external storage device, or other file), at 109. For example, in some embodiments, a user can select to upload an image from a local image store. The image from a local image store could be a picture taken previously, an image downloaded from an image archive, or an image the user created using some other application. Additionally, a user can choose to copy an image from a message or web page. In some embodiments, at 111, the user may opt to take a new picture using a camera associated with the computing device. For example, at 111, a user may select to take a picture to express a particular emotion using a camera associated with the computing device. For example, the image could be of the user (i.e., a selfie), a pet, or another individual. Once selected, this image may be edited for positioning and saved as the image for that emotion, according to some embodiments. Further, as shown in FIG. 1A, at 113, the computing device may then add, at 113, the file uploaded by the user or the picture taken by the user to the existing selfiecon set (as shown at 113).

In some embodiments, as shown in FIG. 1A, a computing device may receive, at 115, an indication of a user's desire to create a new selfiecon set. In some embodiments, at 117, a user may upload a previously created selfiecon set from, for example, an external storage device, a cloud storage device, or from a storage location of the computing device. In some embodiments, an application associated with management of selfiecon sets may allow a user to download an existing, previously created set of selfiecons. For example, a previously created selfiecon set may include pictures of famous celebrities with different facial expressions from their movies, pictures compiled from other users of political candidates with various funny expressions, pictures of pets with human-like facial expressions, or other interesting images. These previously created selfiecon sets may be purchased from an application store (e.g., Google Play®, iTunes®, or other app stores) or through an application for managing selfiecon sets. In such instances, the application or app store may require payment for the preexisting selfiecon set, and at 119, the computing device may confirm receipt of payment before generating the new set of selfiecons in the user's account, at 121. Further, in addition to preexisting selfiecon sets, in some embodiments a user may have the opportunity to download individual preexisting selfiecons for celebrities, pets, or other interesting users. In some embodiments, payment may be required for these individual preexisting selfiecons.

In some embodiments, if the user chooses not to download an existing selfiecon set, the computing device may allow a user to create an empty emoticon set. Accordingly, in some embodiments, the computing device may generate a new, empty selfiecon set, at 121. In some embodiments, after generating the empty selfiecon set, the computing device may present to the user various options for populating the new selfiecon set. For example, as described in relation to 109 and 111, a user can upload an existing image or file or capture a new image using a camera associated with the computing device, as shown at 123 and 125, respectively. In some embodiments, the computing device may add the image uploaded at 123 or captured by the camera at 125 to the newly generated set, as shown at 127. Further, as will be discussed in relation to FIGS. 3 and 4, in some embodiments, the computing device may associate the image uploaded at 123 or captured by the camera at 125 to a text-based selfiecon based on the user's indication of the emotion to be conveyed by the image uploaded at 123 or captured by the camera at 125.

As shown in FIG. 1B, in some embodiments, the method 100 can include steps for deleting an existing selfiecon set. Thus, in some embodiments, at 129 a computing device may receive an indication that a user desires to delete an existing selfiecon set. Accordingly, at 131, the computing device may output for presentation to the user the current list of existing, configured selfiecon sets. In some embodiments, the device may receive an indication of which set(s) a user wishes to delete, as shown at 133. Responsive to the selection, the computing device can delete the selected set.

Figure 2:
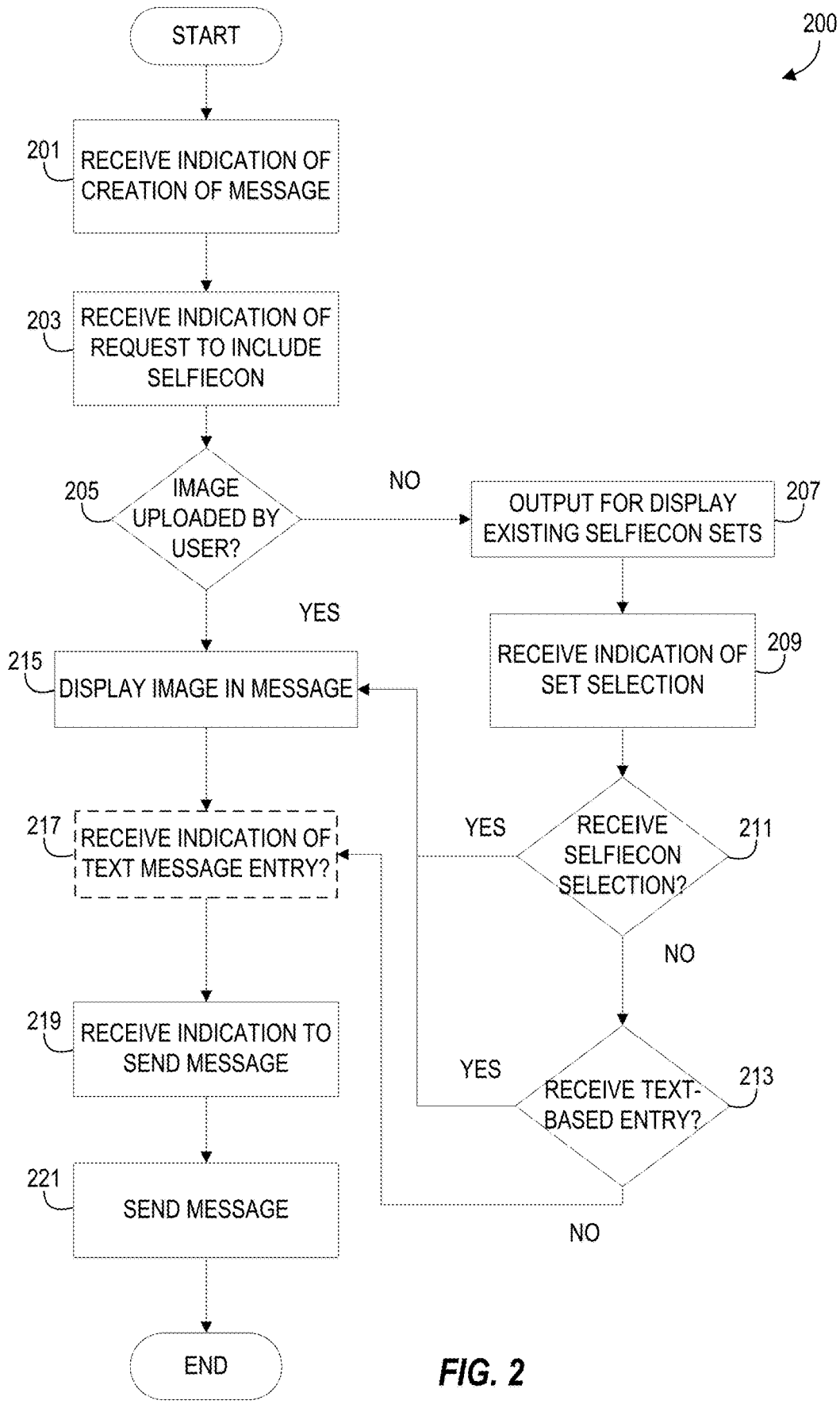
FIG. 2 is a flow diagram illustrating an exemplary method for selecting an electronic self-portrait to use as an indicator of emotion in an electronic communication, according to some embodiments.

Turning now to FIG. 2, a method 200 for using a selected electronic self-portrait for use as an indicator of emotion in an electronic message is illustrated, according to some embodiments. At 201, a computing device may receive an indication that the user has created an electronic message. For example, in some embodiments, this indication may be received from an internal messenger in an application or an external messaging system, such as mobile text, Google Talk®, Facebook Messenger®, or other text or chatting application or system. In some embodiments, the user may create an SMS message. In other embodiments, the user may create a message in various other protocols such as XMPP or WebRTC with JSON-RPC specification. Additionally, in some embodiments, the user can create a message that can be sent via HTTP. As will be understood and appreciated, regardless of the application or system used to create the message, the computing device may receive and process the user's decision to create a new message. Accordingly, responsive to receipt of the indication that a user has created a message, the computing device may present to the user an option to include a selfiecon in the message. For example, in some embodiments, the computing device may present to the user an option to embed or attach a selfie to depict the emotional context of the message (i.e., a selfiecon).

In some embodiments, a user may upload an existing image for inclusion in the electronic message. Thus, the computing device may receive, at 205, an image uploaded by the user for use as the selfiecon in the message. In some embodiments, however, the user may not upload an existing image. In such instances, the computing device may output for display, at 207, the user's existing selfiecon sets from which the user can choose a selfiecon for inclusion in the message. In some embodiments, responsive to receiving an indication of set selection, the computing device may provide, to the user, an option to update an image selected set. For example, in some embodiments, the user may update an image before selecting it to be added to the message to better match the emotional context of the message. In some embodiments, responsive to receiving, at 209, an indication of the user's selection of a particular selfiecon set, the computing device may receive, at 211, an indication of a user's selection of a selfiecon in that set at which point the computing device can display, at 215, the selected image (i.e., selfiecon) in the message (i.e., the computing device can append the selected selfiecon to the message or embed the selected selfiecon in the message). In some embodiments, however, instead of selecting a selfiecon in the chosen set, the user may provide a text-based entry associated with a selfiecon. For example, in some embodiments, selfiecons may be associated with text-based emoticons. Thus, in some embodiments, responsive to receiving, at 213, a text-based entry associated with a selfiecon, the computing device may output for display, at 215, the selfiecon associated with the text-based entry.

In some embodiments, as shown in FIG. 2, after outputting the message for display in the message, the computing device may receive, at 217, the text of the user's message. But, as will be understood and appreciated, the message could contain nothing but the image (i.e., the message may contain no text), and the emotion conveyed by the selfiecon could serve as the message itself. In still other embodiments, the message may include only the text-based emoticon entry if, for example, the text-based entry is not associated with a selfiecon in the user's selected set. Subsequently, the computing device may receive, at 219, an indication to send a message and may send, at 221, the message to the intended recipient.

Figure 3:
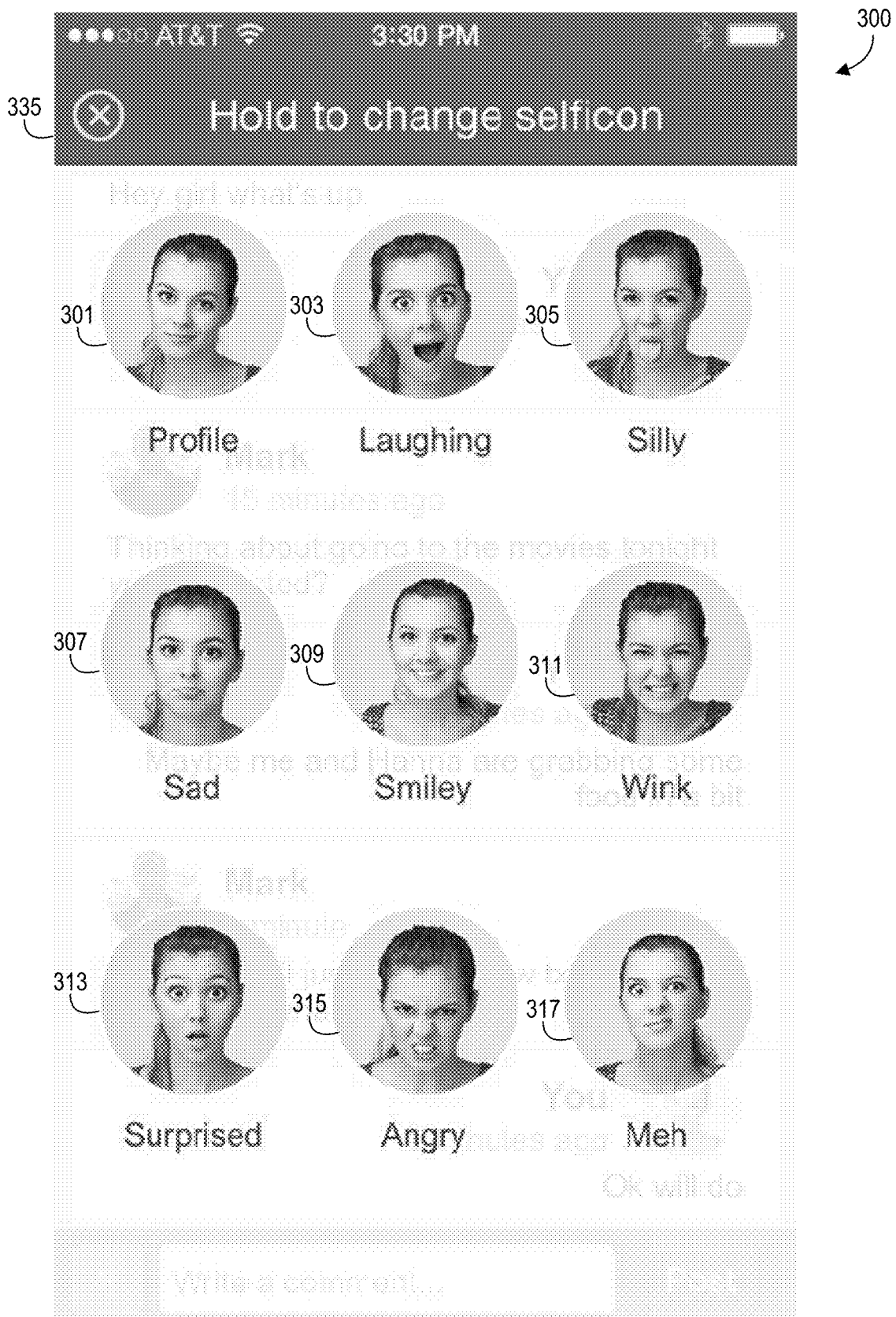
FIGS. 3 and 4 are example user interfaces for managing electronic self-portraits for use as indicators of emotion in electronic communications, according to some embodiments.

FIG. 3 is an example user interface 300 for managing electronic self-portraits for use as indicators of emotion in electronic communications (i.e., selfiecons). According to the embodiment shown in FIG. 3, the user has provided a variety of self-portraits for various emotional indicators (i.e., emoticon types). For example, as shown in FIG. 3, the user has provided self-portraits to use as a profile picture (i.e., default selfiecon) 301 as well as to indicate laughing 303, silly 305, sad 307, smiley 309, wink 311, surprised 313, angry 315, and disinterest (i.e., meh) 317. Additionally, as shown in FIG. 3, an interface 300 for managing selfiecons can include instructions 335 for changing or selecting a selfiecon. For example, in some embodiments, the application can provide an instruction to the user to hold down an image should the user wish to change the image. In some embodiments, the interface 300 may provide instructions to tap an image to select it, or the interface 300 may be configured to respond to a right click or double click to select an image.

Figure 4:
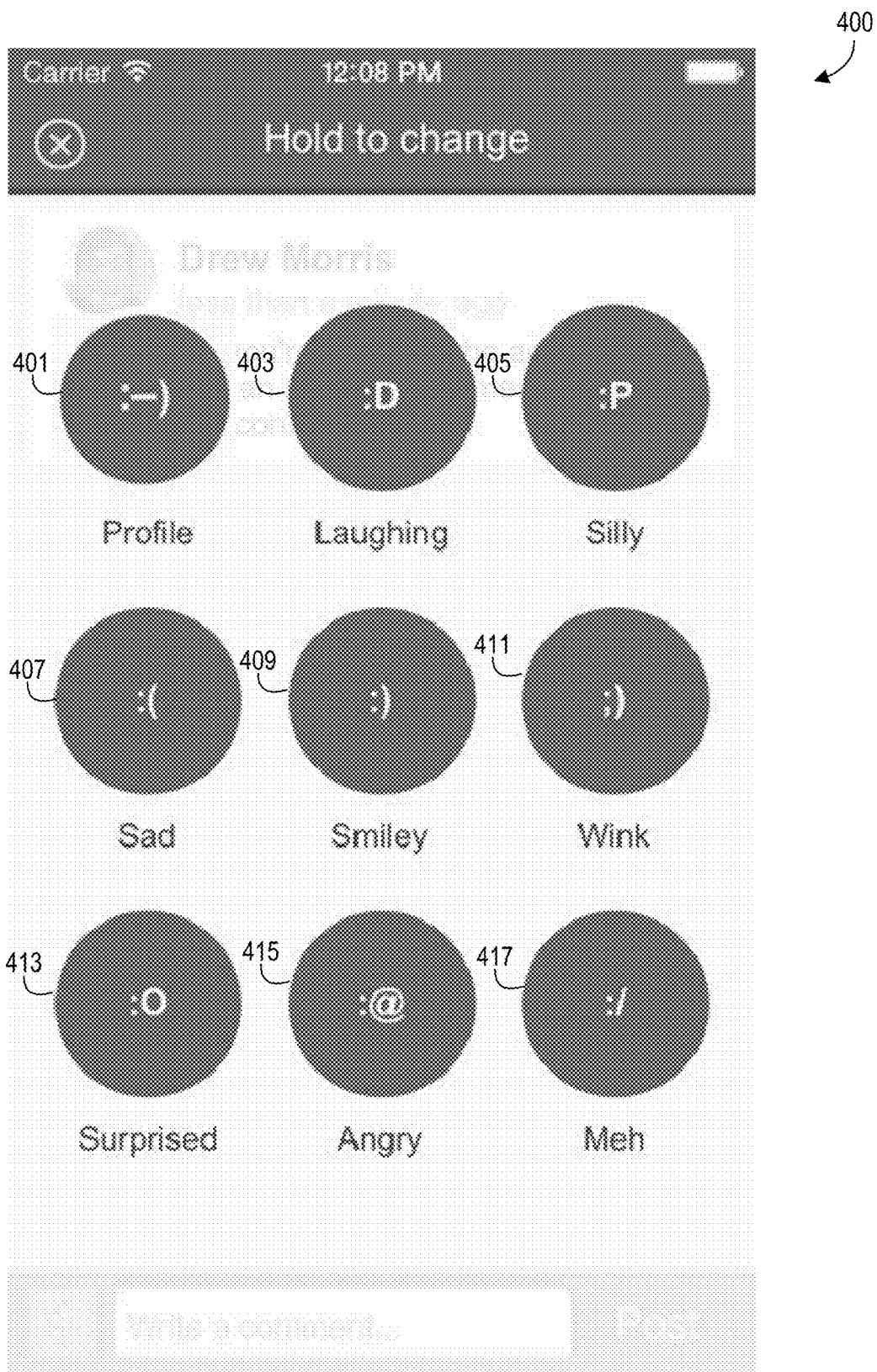

FIG. 4 is an example user interface 400 for managing selfiecons that is similar to the interface 300 shown in FIG. 3. As opposed to the interface 300, however, the selfiecons shown in interface 400 are text-based (i.e., a collection of text-based characters for conveying an emotion). For example, the interface 400 includes a generic text-based profile selfiecon 401 as well as text-based selfiecons to indicate laughing 403, silly 405, sad 407, smiley 409, wink 411, surprised 413, angry 415, and disinterest (i.e., meh) 417. As discussed, in some embodiments, an application for managing selfiecons can associate text-based selfiecons (e.g., 403, 405) with image-based selfiecons (e.g., 303, 305, respectively). Further, in some embodiments, a new selfiecon set may be presented to a user with generic text-based selfiecons similar to those shown in FIG. 4, and the interface for managing the selfiecon set (e.g., interface 400) or the computing device may allow the user to add images to associate directly to the text-based selfiecons. In some embodiments, holding down each icon may allow the user to associate an image or upload an image similar to the method discussed at 109 and 123. In some embodiments, the text-based emoticons may represent the image as it would be displayed at an incompatible mobile device (i.e., a mobile device incapable of displaying an image-based selfiecon selected by the user). For example, in some embodiments, if a user is viewing an electronic message via an application or device that is not compatible with the image-based selfiecons presented in this disclosure, the message may merely show the text-based representation of the selfiecon (e.g., 403) instead of the image-based selfiecon (e.g., 303) the sending user intended. In some embodiments, the sending user's chat or messaging application (or the sending user's computing device) may have foreknowledge that the receiving device is incompatible with image-based selfiecons. In other embodiments, the decision to send or display a text-based selfiecon as opposed to an image-based selfiecon may be based on the protocol of the messaging application. For example, in embodiments where the text including the selfiecon is sent via SMS, the sending device may send a text-based selfiecon to the receiving device. Alternatively, in some embodiments, if the message including the selfiecon is sent in MMS, a computing device may send the image-based version of the selected selfiecon.

Additionally, in some embodiments, a user interface for managing selfiecons (e.g., 400), which may allow a user to create selfiecon sets, may assign values to image-based selfiecons that correspond to various text-based selfiecons (i.e., collections of text symbols). For example, in some embodiments, a management interface 400 may assign a value "1" to the text-based smiley selfiecon 409, which corresponds to ":)", as well as the image-based smiley selfiecon 309. Accordingly, in some embodiments, the management interface 400 may keep track of the value associated to each selfiecon, such that, if a user is sending a message that includes a selfiecon to an application or device that is incompatible with image-based selfiecons, the sending device may send the message with the text-based selfiecon or a URL for the image-based selfiecon. In some embodiments, however, if the user is sending a message that includes a selfiecon to an application or device that is compatible with image-based selfiecons, then the sending device or the chat or text application may use the image-based selfiecon selected by the user.

In some embodiments, selfiecons and the values associated with them may be used to track sentiment. For example, in some embodiments, the selfiecons and the associated values may correspond to a tagging mechanism. Thus, in some embodiments, upon receipt of a message that makes the user happy, a user may post the selfiecon related to the sentiment of happiness (e.g., 309, 409). A tagging mechanism may subsequently tag the message that prompted the user's "happy response" as, for example, happy. In some embodiments, the tagging mechanism may track this tagging by assigning number values corresponding to different categories of sentiment. For example, in the foregoing example, each word in the message that prompted the user's "happy response" could be tagged as "happy." Accordingly, through a process of predictive analysis, the tagging mechanism or an associated application can pre-scan incoming messages and predict a sentiment associated with the message based on the words included in the incoming message and the categories of sentiment associated to those words.

Figure 5:
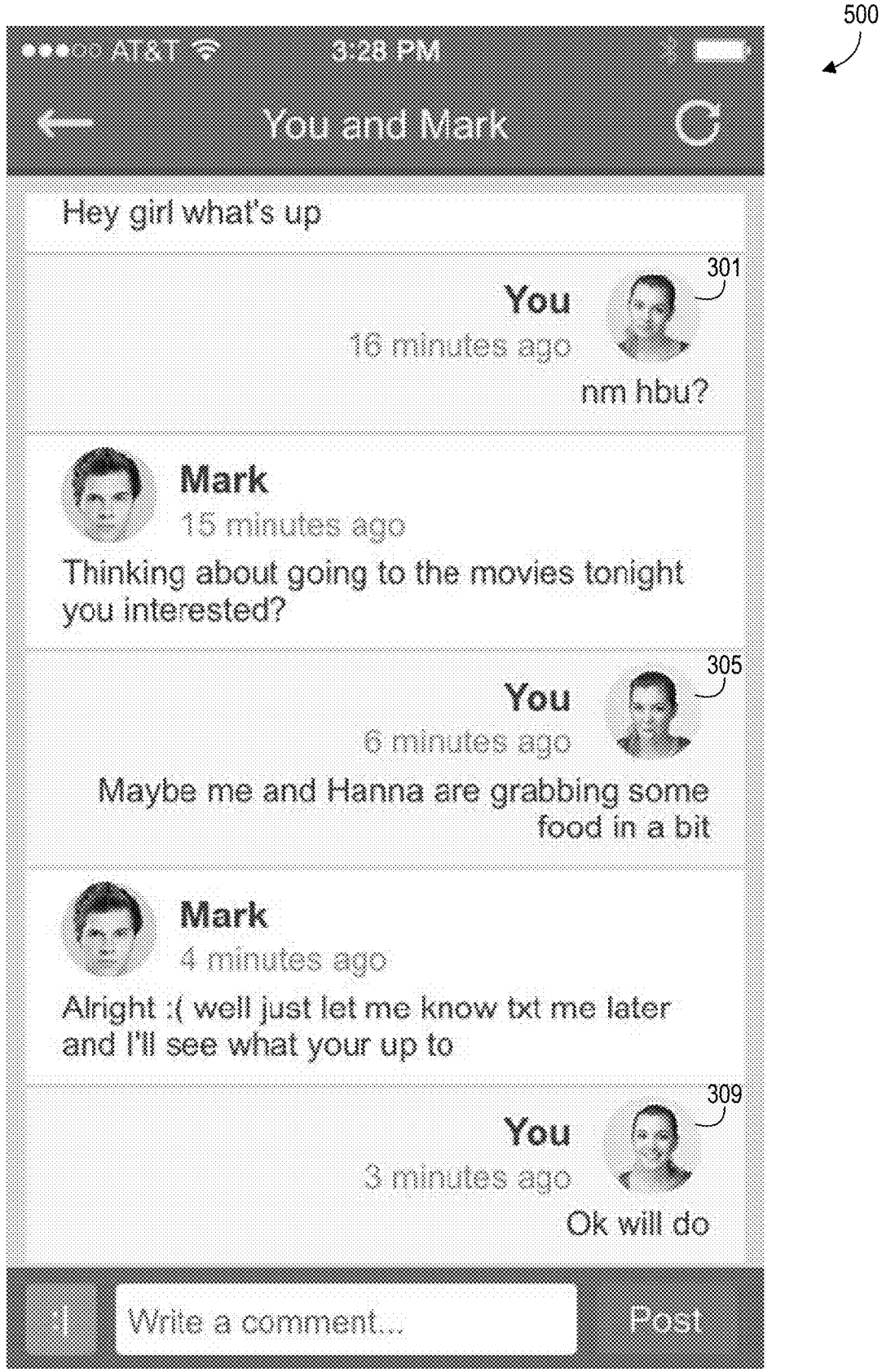
FIG. 5 is an illustration of an example chat session including electronic self-portraits as indicators of emotions in electronic communications, according to some embodiments.

FIG. 5 illustrates an example chat session 500 in which users are viewing various messages that include image-based selfiecons as selected by the chat participants. For example, as shown in FIG. 5, the female user has included her profile selfiecon 301 as well as her silly and smiley selfiecons, 305 and 309 respectively, in her messages. As will be understood and appreciated, the exact colors, fonts, and placement of elements on the screen are not relevant to the embodiment and other colors, fonts, and placements are contemplated.

Figure 6:
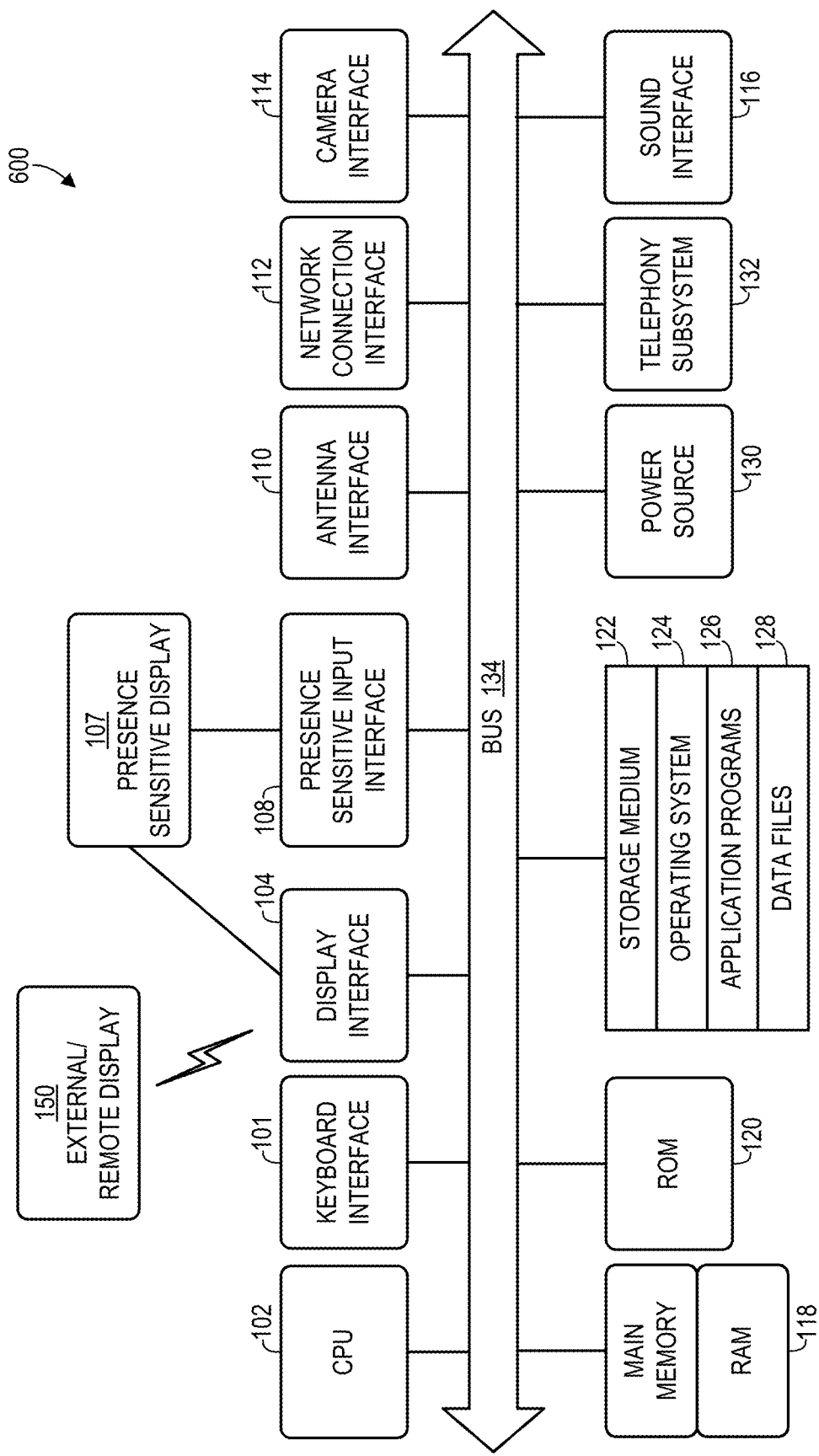
FIG. 6 is a block diagram of an illustrative computer system architecture 600, according to an example embodiment.

As desired, embodiments of the disclosed technology may include a computing device with more or less of the components illustrated in FIG. 6. It will be understood that the computing device architecture 600 is provided for example purposes only and does not limit the scope of the various embodiments of the present disclosed systems, methods, and computer-readable mediums.

The computing device architecture 600 of FIG. 6 includes a central processing unit (CPU) 602, where computer instructions are processed; a display interface 604 that acts as a communication interface and provides functions for rendering video, graphics, images, and texts on the display. In certain example embodiments of the disclosed technology, the display interface 604 may be directly connected to a local display, such as a touch-screen display associated with a mobile computing device. In another example embodiment, the display interface 604 may be configured for providing data, images, and other information for an external/remote display that is not necessarily physically connected to the mobile computing device. For example, a desktop monitor may be utilized for mirroring graphics and other information that is presented on a mobile computing device. In certain example embodiments, the display interface 604 may wirelessly communicate, for example, via a Wi-Fi® channel or other available network connection interface 612 to the external/remote display.

In an example embodiment, the network connection interface 612 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth® port, a near-field communication (NFC) port, another like communication interface, or any combination thereof. In one example, the display interface 604 may be operatively coupled to a local display, such as a touch-screen display associated with a mobile device. In another example, the display interface 604 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 604 may wirelessly communicate, for example, via the network connection interface 612 such as a Wi-Fi® transceiver to the external/remote display.

The computing device architecture 600 may include a keyboard interface 606 that provides a communication interface to a keyboard. In one example embodiment, the computing device architecture 600 may include a presence-sensitive display interface 608 for connecting to a presence-sensitive display 607. According to certain example embodiments of the disclosed technology, the presence-sensitive display interface 608 may provide a communication interface to various devices such as a pointing device, a touch screen, a depth camera, etc. which may or may not be associated with a display. The computing device architecture 600 may be configured to use an input device via one or more of input/output interfaces (for example, the keyboard interface 606, the display interface 604, the presence sensitive display interface 608, network connection interface 612, camera interface 614, sound interface 616, etc.,) to allow a user to capture information into the computing device architecture 600. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 600 or may be a separate device. For example, the input device may be an accelerometer, a magnetometer, a digital camera, a microphone, and an optical sensor.

Example embodiments of the computing device architecture 600 may include an antenna interface 610 that provides a communication interface to an antenna; a network connection interface 612 that provides a communication interface to a network. As mentioned above, the display interface 604 may be in communication with the network connection interface 612, for example, to provide information for display on a remote display that is not directly connected or attached to the system. In certain embodiments, a camera interface 614 is provided that acts as a communication interface and provides functions for capturing digital images from a camera. In certain embodiments, a sound interface 616 is provided as a communication interface for converting sound into electrical signals using a microphone and for converting electrical signals into sound using a speaker. According to example embodiments, a random access memory (RAM) 618 is provided, where computer instructions and data may be stored in a volatile memory device for processing by the CPU 602.

According to an example embodiment, the computing device architecture 600 includes a read-only memory (ROM) 620 where invariant low-level system code or data for basic system functions such as basic input and output (I/O), startup, or reception of keystrokes from a keyboard are stored in a non-volatile memory device. According to an example embodiment, the computing device architecture 600 includes a storage medium 622 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 624, application programs 626 (including, for example, a web browser application, a widget or gadget engine, and or other applications, as necessary) and data files 628 are stored. According to an example embodiment, the computing device architecture 600 includes a power source 630 that provides an appropriate alternating current (AC) or direct current (DC) to power components.

According to an example embodiment, the computing device architecture 600 includes and a telephony subsystem 632 that allows the device 600 to transmit and receive sound over a telephone network. The constituent devices and the CPU 602 communicate with each other over a bus 634.

According to an example embodiment, the CPU 602 has appropriate structure to be a computer processor. In one arrangement, the CPU 602 may include more than one processing unit. The RAM 618 interfaces with the computer bus 634 to provide quick RAM storage to the CPU 602 during the execution of software programs such as the operating system application programs, and device drivers. More specifically, the CPU 602 loads computer-executable process steps from the storage medium 622 or other media into a field of the RAM 618 in order to execute software programs. Data may be stored in the RAM 618, where the data may be accessed by the computer CPU 602 during execution. In one example configuration, the device architecture 600 includes at least 128 MB of RAM, and 256 MB of flash memory.

The storage medium 622 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 622, which may comprise a machine-readable storage medium.

According to one example embodiment, the term computing device, as used herein, may be a CPU, or conceptualized as a CPU (for example, the CPU 602 of FIG. 6). In this example embodiment, the computing device (CPU) may be coupled, connected, and/or in communication with one or more peripheral devices, such as display. In another example embodiment, the term computing device, as used herein, may refer to a mobile computing device such as a smartphone, tablet computer, or smart watch. In this example embodiment, the computing device may output content to its local display and/or speaker(s). In another example embodiment, the computing device may output content to an external display device (e.g., over Wi-Fi®) such as a TV or an external computing system.

In example embodiments of the disclosed technology, a computing device may include any number of hardware and/or software applications that are executed to facilitate any of the operations. In example embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth® enabled network, a Wi-Fi® enabled network, a satellite-based network any wired network, any wireless network, etc., for communication with external devices and/or systems.

Although the preceding description contains significant detail, it should not be construed as limiting the scope of the disclosure but rather as providing illustrations of the preferred embodiments of the disclosure. As an example, the layout of elements in FIGS. 3-5 suggests a mobile device. In some embodiments, the systems and methods could be embodied on an application for a desktop computer with far different screen sizes and input capabilities. Such a variation would not materially alter the nature of the disclosure. Thus, the scope of the disclosure should be fixed by the following claims rather than any specific examples provided.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the present disclosure can be performed by a programmable processor executing a program of instructions to perform functions of the disclosed technology by operating based on input data, and by generating output data. The disclosed technology may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

Accordingly, the scope of the present inventions is defined by the appended claims rather than the foregoing description and the exemplary embodiments described therein.

What is claimed is:

1. A method comprising:

receiving, at a computing device, an indication of a user's request to create a new set of electronic self-portraits for conveying emotion in an electronic message, the new set being separate and distinct from any existing, configured sets;

generating, by the computing device, the new set of electronic self-portraits for conveying emotion in an electronic message, the new set being an empty set;

receiving, at the computing device, a file selected by the user for adding to the new set;

associating, by the computing device, the file to the new set to create an electronic self-portrait for conveying emotion in an electronic message;

responsive to receiving, at the computing device, an indication of an emotion to be conveyed by the electronic self-portrait for conveying emotion in an electronic message, associating a pre-existing collection of text-based characters for conveying the emotion to the electronic self-portrait for conveying emotion in an electronic message;

receiving, at the computing device, a received electronic message;

receiving, at the computing device, an indication of a request (i) to create an electronic message responding to the received message and (ii) to include an electronic self-portrait for conveying emotion in the electronic message;

outputting, by the computing device and for display to the user, the new set of electronic self-portraits for conveying emotion;

responsive to receiving a selection of a particular electronic self-portrait for conveying emotion from the set of electronic self-portraits for conveying emotion, outputting, by the computing device and for display to the user, an option to update the particular electronic self-portrait for conveying emotion;

responsive to receiving, at the computing device, an indication of a user confirmation to keep the particular electronic self-portrait for conveying emotion, outputting, by the computing device and for display to the user, the particular electronic self-portrait for conveying emotion;

responsive to receiving an indication of a request to send the electronic message, sending the electronic message to a sender of the received message, the particular electronic self-portrait for conveying emotion positioned separate and apart from a textual message included in the electronic message;

responsive to determining that the user responded to the received electronic message with the particular electronic self-portrait for conveying emotion, tagging, by the computing device, the received electronic message by assigning a number value to the received electronic message;

pre-scanning, by the computing device, a subsequent received message and comparing the subsequent received message to the assigned number value; and predicting, by the computing device and based on comparing the subsequent received message to the assigned number value, if the user is likely to respond to the subsequent received message with the particular electronic self-portrait for conveying emotion.

2. The method of claim 1, wherein the file selected by the user for adding to the new set is an image captured by a camera device associated with the computing device.

3. The method of claim 1, wherein the file selected by the user for adding to the new set is a preexisting electronic self-portrait for conveying emotion in an electronic message.

4. The method of claim 3, wherein the preexisting electronic self-portrait for conveying emotion in an electronic message comprises a portrait of a celebrity.

5. The method of claim 1, wherein outputting the particular electronic self-portrait for conveying emotion for display to the user includes embedding the particular electronic self-portrait for conveying emotion in the electronic message.

6. A non-transitory computer-readable medium storing instructions that, when executed by one or more processors, cause a computing device to:

responsive to receiving an indication of a user's request to create a new set of electronic self-portraits for conveying emotion in an electronic message to respond to a received electronic message, generate the new set of electronic self-portraits for conveying emotion in an electronic message;

receive a file selected by the user for adding to the new set;

associate the file to the new set to create an electronic self-portrait for conveying emotion in an electronic message;

responsive to receiving an indication of an emotion to be conveyed by the electronic self-portrait for conveying emotion in an electronic message, associate a pre-existing collection of text-based characters for conveying the emotion to the electronic self-portrait for conveying emotion in an electronic message;

receive an indication of a request (i) to create an electronic message and (ii) to include an electronic self-portrait for conveying emotion in the electronic message;

output, for display to a user, the new set of electronic self-portraits for conveying emotion;

responsive to receiving a selection of a particular electronic self-portrait for conveying emotion from the set of electronic self-portraits for conveying emotion, output, by the computing device and for display to the user, an option to update the particular electronic self-portrait for conveying emotion;

responsive to receiving, at the computing device, an indication of a user confirmation to keep the particular electronic self-portrait for conveying emotion, output, for display to the user, the particular electronic self-portrait for conveying emotion;

responsive to receiving, at the computing device, an update to the particular electronic self-portrait for conveying emotion, output, for display to the user, the updated electronic self-portrait for conveying emotion;

responsive to receiving an indication of a request to send the electronic message, send the electronic message to a sender of the received message, the particular electronic self-portrait for conveying emotion or the updated electronic self-portrait for conveying emotion positioned separate and apart from a textual message included in the electronic message;

responsive to determining that the user responded to the received electronic message with the particular electronic self-portrait for conveying emotion, tag the received electronic message by assigning a number value to the received electronic message;

pre-scan a subsequent received message and compare the subsequent received message to the assigned number value; and predict, based on comparing the subsequent received message to the assigned number value, if the user is likely to respond to the subsequent received message with the particular electronic self-portrait for conveying emotion.

7. The non-transitory computer-readable medium of claim 6, wherein the file selected by the user for adding to the new set is an image captured by a camera device associated with the computing device.

8. The non-transitory computer-readable medium of claim 6, wherein the file selected by the user for adding to the new set is a preexisting electronic self-portrait for conveying emotion in an electronic message.

9. The non-transitory computer-readable medium of claim 8, wherein the preexisting electronic self-portrait for conveying emotion in an electronic message comprises a portrait of a celebrity.

10. The non-transitory computer-readable medium of claim 6, wherein outputting the particular electronic self-portrait for conveying emotion for display to the user includes embedding the particular electronic self-portrait for conveying emotion in the electronic message.

* * * * *